United States Patent
Kim et al.

(10) Patent No.: US 12,406,993 B2
(45) Date of Patent: Sep. 2, 2025

(54) DRY ELECTRODE COMPOSITION FOR SECONDARY BATTERY, METHOD FOR MANUFACTURING DRY ELECTRODE SHEET, DRY ELECTRODE SHEET, ELECTRODE, AND SECONDARY BATTERY

(71) Applicant: SK On Co., Ltd., Seoul (KR)

(72) Inventors: Young Jun Kim, Daejeon (KR); Yong Hee Kang, Daejeon (KR); Dong Hoon Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/321,389

(22) Filed: May 22, 2023

(65) Prior Publication Data
US 2023/0378469 A1    Nov. 23, 2023

(30) Foreign Application Priority Data

May 23, 2022    (KR) .......................... 10-2022-0062785

(51) Int. Cl.
*H01M 4/04* (2006.01)
*H01M 4/139* (2010.01)
*H01M 4/62* (2006.01)
*H01M 4/02* (2006.01)

(52) U.S. Cl.
CPC ......... *H01M 4/623* (2013.01); *H01M 4/0435* (2013.01); *H01M 4/0471* (2013.01); *H01M 2004/021* (2013.01)

(58) Field of Classification Search
None
See application file for complete search history.

(56) References Cited

U.S. PATENT DOCUMENTS

| | | | | |
|---|---|---|---|---|
| 5,749,927 A | * | 5/1998 | Chern | H01M 4/13 29/623.5 |
| 6,127,474 A | * | 10/2000 | Andelman | C08K 3/013 524/495 |
| 6,479,188 B1 | * | 11/2002 | Chi | H01M 4/96 429/232 |
| 2005/0250011 A1 | * | 11/2005 | Mitchell | H01M 4/0409 429/217 |
| 2006/0109608 A1 | * | 5/2006 | Zhong | H01M 4/926 361/502 |
| 2020/0168895 A1 | | 5/2020 | Kim et al. | |

FOREIGN PATENT DOCUMENTS

| | | |
|---|---|---|
| KR | 10-2016-0145043 A | 12/2016 |
| KR | 10-2241068 B1 | 4/2021 |
| KR | 10-2261501 B1 | 6/2021 |

OTHER PUBLICATIONS

Isopar G (Year: 2023).*

* cited by examiner

*Primary Examiner* — Tracy M Dove
(74) *Attorney, Agent, or Firm* — IP & T GROUP LLP (57) ABSTRACT

A dry electrode composition including: an electrode active material; a particulate binder in which fibers aggregate to form bundles; and a plasticizer, wherein the binder is fiberizable by heat and pressure, a method for manufacturing a dry electrode sheet for a secondary battery using the dry electrode composition, and an electrode and a secondary battery including the dry electrode sheet are provided.

7 Claims, 3 Drawing Sheets

DRY ELECTRODE COMPOSITION FOR SECONDARY BATTERY, METHOD FOR MANUFACTURING DRY ELECTRODE SHEET, DRY ELECTRODE SHEET, ELECTRODE, AND SECONDARY BATTERY

CROSS-REFERENCE TO RELATED APPLICATION(S)

This application claims benefit of priority to Korean Patent Application No. 10-2022-0062785 filed on May 23, 2022 in the Korean Intellectual Property Office, the disclosure of which is incorporated herein by reference in its entirety.

BACKGROUND

1. Field

The present disclosure relates to a dry electrode composition for a secondary battery, a method for manufacturing a dry electrode sheet and a dry electrode sheet using the composition, and an electrode and a secondary battery including the dry electrode sheet.

2. Description of Related Art

A lithium secondary battery is an energy source of a mobile device, and also, in recent years, use as a power source of electric vehicles (EV) and hybrid electric vehicles (HEV) is becoming reality, and demand therefor is also continuously increasing.

In general, an electrode of a lithium secondary battery is manufactured by dispersing an electrode mixture including an electrode active material and a binder in a solvent such as water or NMP to prepare an electrode active material slurry, applying the slurry on a current collector, and drying the slurry.

In the drying process, the solvent contained in the electrode mixture slurry is evaporated, and in the drying process of evaporating the solvent, defects such as pin holes or cracks may occur in the previously formed electrode mixture layer.

In addition, since the inside and the outside of the electrode mixture layer are not uniformly dried, a migration phenomenon in which particles float together by a difference in an evaporation rate of the solvent occurs, that is, particles such as a binder migrate with the evaporated solvent from an area which dries first and float to the surface to form a gap between the area which dries first and an area which dries relatively later, thereby deteriorating electrode quality.

In order to solve the problem as such, a technology to evenly dry the inside and the outside of the electrode mixture layer, while adjusting the evaporation rate of the solvent, is being developed. However, since drying devices applied to the technology are very expensive and significant costs and time are required for their operation, the technology is disadvantageous in terms of manufacturing processability.

Meanwhile, recently, a dry electrode manufacturing method has been suggested for improving the electrode quality deterioration and manufacturing processability problems. Since in the dry electrode manufacturing method, an electrode active material, a binder, and the like are not dissolved in a solvent, a drying process may be omitted, but a dry electrode manufactured by the method has insufficient tensile strength, so that the electrode does not maintain a sheet shape, for example, cracks occur in a manufactured electrode sheet.

Therefore, in the manufacturing of an electrode, there is a high need for a technology which does not cause migration of a binder to improve electrode quality, and secure the tensile strength of an electrode while improving manufacturing processability.

In addition, since in recent years, price competition of a secondary battery is intensifying, there is an urgent need for a method for manufacturing an electrode which may reduce cost in an electrode manufacturing process.

SUMMARY

An aspect of the present disclosure may provide a dry electrode composition which allows for manufacturing of an electrode with a dry method even while not including a solvent.

Another aspect of the present disclosure may provide a method for manufacturing an electrode sheet with a dry method using the dry electrode composition.

Another aspect of the present disclosure may provide an electrode and a secondary battery including the dry electrode sheet manufactured by the dry electrode composition.

According to an aspect of the present disclosure, a dry electrode composition may include a particulate binder in which fibers aggregate to form bundles; and a plasticizer, wherein the binder is fiberizable by heat or pressure.

The binder may be at least one selected from the group consisting of polytetrafluoroethylene, polyethylene oxide, polyacrylonitrile, polyvinylidene fluoride, cellulose derivatives, and propionate.

The binder may be included at a content of 1 to 5 wt % with respect to the solids content weight of the electrode composition.

The plasticizer may include a liquid paraffin.

The plasticizer may be included at a content of 5 to 40 parts by weight with respect to 100 parts by weight of the binder.

The composition may further include at least one selected from the group consisting of a conductive agent and a particulate binder.

According to another aspect of the present disclosure, a method for manufacturing an electrode sheet may include calendering any one of the dry electrode compositions while supplying heat to the composition, thereby manufacturing an electrode sheet.

The calendering may be performed at a temperature of 50 to 200° C.

A operation of kneading the dry electrode composition under heating to fiberize the binder may be further included.

The kneading may be performed by heating to a temperature of 30 to 200° C.

The kneading may be performed by applying shear pressure.

The kneading may be performed at a rotational speed of 20 to 50 rpm.

The kneading may be performed for 1 to 10 minutes.

A drying process of removing a plasticizer may be further included after the calendering.

According to another aspect of the present disclosure, a dry electrode sheet for a secondary battery manufactured by any one of the manufacturing methods may be provided.

The binder may be present in a fibrous form.

The electrode sheet may have a tensile strength of 0.40 N/mm² or more.

The electrode sheet may have an electrode density of 2.0 g/cc or more.

The electrode sheet may have a thickness of 100 to 500 μm.

According to another aspect of the present disclosure, an electrode for a secondary battery may include a current collector; and any one of the dry electrode sheets for a secondary battery on at least one surface of the current collector.

The electrode sheet may have a tensile strength of 0.40 N/mm² or more.

The electrode may be at least one of a negative electrode and a positive electrode.

According to another aspect of the present disclosure, a secondary battery may comprise an electrode assembly including an anode, a separator, and a cathode, and an electrolyte solution, wherein the electrode assembly and the electrolyte solution are accommodated in a battery case and sealed, wherein at least one of the positive electrode and the negative electrode is any one of the electrodes described above.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings. However, the exemplary embodiments in the present disclosure may be modified in many different forms and the scope of the disclosure should not be limited to the embodiments set forth herein.

In general, in the manufacturing of an electrode, an electrode active material, a binder, and the like are dispersed in a large amount of solvent such as an organic solvent such as NMP or a water-based solvent such as water to prepare a slurry, an electrode current collector is coated with the slurry, and then the slurry is dried to remove the solvent. Thus, a separate process is required for removing the large amount of solvent to cause increased electrode manufacturing costs. In addition, the binder migrates to the surface of the electrode with a solvent volatilized in the process of removing solvent, thereby concentrating a large amount of the binder on the surface of the electrode to cause problems, such as decreasing a binding force between electrode active materials and peeling off the electrode mixture layer from the electrode current collector.

Thus, the present disclosure intends to manufacture an electrode by a dry method without including a conventional solvent, and according to an aspect of the present disclosure, a dry electrode composition which does not include a conventional large amount of solvent is intended to be provided.

According to an embodiment in the present disclosure, a dry electrode composition includes an electrode active material and a binder.

In an exemplary embodiment, the dry electrode composition may be a positive electrode composition or a negative electrode composition. Therefore, the electrode active material included in the electrode active material may be a positive electrode active material or a negative electrode active material.

As the positive electrode active material, a compound capable of reversible insertion of desorption of lithium (lithiated intercalation compound) may be used. Specifically, one or more of composite oxides of a metal selected from cobalt, manganese, nickel, and a combination thereof with lithium may be used.

As a more specific example, a lithium transition metal compound (oxide) having a layered structure, represented by a general formula of $LiMO_2$ may be used, wherein M includes at least one of transition metal elements such as Ni, Co, and Mn, and may further include other metal elements or non-metal elements. The composite oxide may include, for example, a unary lithium transition metal composite oxide including one of the transition metal elements, a so-called binary lithium transition metal composite oxide including two of the transition metal elements, and a ternary lithium transition metal composite oxide including Ni, Co, and Mn as a constituent element. Specifically, it may be $Li_xMn_{1-y}M_yA_2$, $Li_xMn_{1-y}MyO_{2-z}X_z$, $Li_xMn_2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yM_zA_\alpha$, $Li_xNi_{1-y-z}Co_yM_zO_{2-\alpha}X_\alpha$, $Li_xNi_{1-y-z}Mn_yM_zA_\alpha$, $Li_xNi_{1-y-z}Mn_yM_zO_{2-\alpha}X$ (wherein $0.9 \leq x \leq 1.1$, $0 \leq y \leq 0.5$, $0 \leq z \leq 0.5$, and $0 \leq \alpha \leq 2$, M and M' are the same as or different from each other and selected from the group consisting of Mg, Al, Co, K, Na, Ca, Si, Ti, Sn, V, Ge, Ga, B, As, Zr, Mn, Cr, Fe, Sr, V, and rare earth elements, A is selected from the group consisting of O, F, S, and P, and X is selected from F, S, and P), and for example, a ternary lithium transition metal composite oxide such as $Li(Ni_{1/3}Co_{1/3}Mn_{1/3})O_2$.

In addition, a lithium transition metal compound (oxide) represented by a general formula $Li_2MO_3$ wherein M include at least one of transition metal elements such as Mn, Fe, and Co, and may further include other metal elements or non-metal elements may be used, and may include, for example, $Li_2MnO_3$, $Li_2PtO_3$, and the like.

In addition, the positive electrode active material may be a solid solution of $LiMO_2$ and $Li_2MO_3$, and for example, may be a solid solution represented by $0.5LiNiMnCoO_2$-$0.5Li_2MnO_3$.

Furthermore, the positive electrode active material having a coating layer on the surface may be used, or a mixture of the compound and the compound having a coating layer may be used. The coating layer may include at least one coating element compound selected from the group consisting of oxides, hydroxides, oxyhydroxides, oxycarbonates, and hydrocarbonates of the coating element. The compound forming the coating layer may be amorphous or crystalline. As the coating element included in the coating layer, Mg, Al, Co, K, Na, Ca, Si, Ti, V, Sn, Ge, Ga, B, As, Zr, a mixture thereof may be used.

In the positive electrode, the positive electrode active material may be included at 90 to 98 wt % with respect to the total amount of the dry positive electrode composition.

Meanwhile, the negative electrode active material may be, for example, a carbon-based negative electrode active material. The carbon-based negative electrode active material is appropriately used in the present disclosure and not particularly limited as long as it is commonly used in the manufacture of the negative electrode of a secondary battery, but may be artificial graphite, natural graphite, or a mixture of artificial graphite and natural graphite. The artificial graphite may further improve dispersibility of a slurry, and may improve lifespan and high temperature storage properties.

The form of the artificial graphite or the natural graphite may be amorphous, platy, flaky, spherical, fibrous, or a combination thereof. In addition, when the artificial graphite and the natural graphite are used as a mixture, a mixing ratio may be 70:30 to 95:5 as a weight ratio.

The negative electrode active material may be used without particular limitation as long as it has a function of occluding and desorbing a lithium ion, and may have an aspect ratio of 20 or more in terms of improving the function of the negative electrode active material for a lithium secondary battery.

In addition, the negative electrode active material may further include at least one of a silicon (Si)-based negative electrode active material, a tin (Sn)-based negative electrode active material, or a lithium vanadium oxide negative electrode active material, together with the carbon-based negative electrode active material. When the negative electrode active material further includes them, it may include them in a range of 1 to 50 wt % with respect to the total weight of the negative electrode active material.

The Si-based negative electrode active material may be Si, a Si—C composite, $SiO_x$ (0<x<2), or a Si-Q alloy. In the Si-Q alloy, Q may be an element selected from the group consisting of alkaline metals, alkali earth metals, group 13 elements, group 14 elements other than Si, group 15 elements, group 16 elements, transition metal elements, rare earth elements, and a combination thereof, and specifically, may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

Generally, a Si-based negative electrode active material as a negative electrode active material is known to have a characteristic of a large volume change. Thus, a silicon-based negative electrode active material may be usually further included with a carbon-based negative electrode active material such as graphite, and in which a carbon nanotube may be included as a conductive agent in terms of preventing swelling due to volume expansion of the silicon-based negative electrode active material.

The Sn-based negative electrode active material may be Sn, $SnO_2$, or a Sn—R alloy. In the Sn—R alloy, R may be an element selected from the group consisting of alkaline metals, alkali earth metals, group 13 elements, group 14 elements other than Sn and Si, group 15 elements, group 16 elements, transition metal elements, rare earth elements, and a combination thereof, and specifically, may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Tl, Ge, P, As, Sb, Bi, S, Se, Te, Po, and a combination thereof. In addition, at least one of them and $SiO_2$ may be mixed and used.

A content of the negative electrode active material in a negative electrode mixture layer may be 94 to 98 wt % with respect to the total weight of the dry negative electrode composition.

The dry electrode composition includes a binder. The binder may be a binder which is fiberizable by heat and pressure. The fiberizable binder as described above is a binder having a particle shape in which fibers aggregate to form bundles, and is softened by applying predetermined heat and pressure, and also the fiber bundles are unraveled to become fibers. The fibers as such are distributed on the surface of particles such as an electrode active material to firmly bind the particles, thereby providing tensile strength to an electrode sheet, and maintaining a sheet shape. In addition, when the electrode sheet is laminated on the surface of an electrode sheet current collector to manufacture an electrode, the electrode sheet may be firmly joined to the surface of the electrode current collector.

The fiberizable binder may include, for example, polytetrafluoroethylene, polyethylene oxide, polyvinylpyrrolidone, polyvinyl alcohol, and cellulose derivatives. The binder as such are particles in which fine fibers aggregate to form bundles, and fibers forming the bundles are released by applying predetermined heat and pressure to form a fine fibrous shape. The fiberizable binder as such may include, for example, PTFE Fine Powder of Grade F-104 available from Daikin, Japan, TF2021Z PTFE Fine Powder Grade available from 3M, U.S.A., PTFE Fine Powder of Grade DF-201 available from Dongyue, China, or the like.

The fiberizable binder may have a tensile strength of 20 to 50 $N/mm^2$, for example, 20 to 45 $N/mm^2$ or 24 to 45 $N/mm^2$ after fiberization.

Without being particularly limited, the binder may have an elongation of 350 to 550%, and for example, 380 to 5200.

In addition, without being limited thereto, the binder may have a specific gravity of 2.0 to 2.5 g/cc, and for example, 2.15 to 2.2 g/cc.

The binder may be included at a content of 1 to 5 wt % with respect to the solids content of the dry electrode composition. For example, the binder may be included at a content of 1 wt % or more, 1.5 wt % or more, or 2 wt % or more and 5 wt % or less, 4.5 wt % or less, or 4 wt % or less. When the content of the binder is less than 1 wt o, a binding force of binding particulate constituent components such as the electrode active material included in the dry electrode composition is low, so that it may be difficult to maintain a sheet shape, and when the content is more than 5 wt %, electrode resistance is excessively increased.

The dry electrode composition may include a plasticizer. The plasticizer may serve as a processing aid for the binder described above, that is, the fiberizable binder, improve dispersibility of the binder, promote binder fiberization, and furthermore, further improve the tensile strength of an electrode sheet manufactured by the dry method.

The plasticizer may include a liquid paraffin, and the liquid paraffin is an alkane hydrocarbon having a chemical formula of $C_nH_{2n+2}$ wherein n is 19 or more, specifically 20 to 40.

The plasticizer may be, for example, a liquid paraffin of Grade ISOPAR-E and ISOPAR-M available from Exxon Mobile.

The plasticizer may have a boiling point of 110 to 230° C., and for example, 115 to 225° C.

In addition, the plasticizer may have an evaporation rate of 0.1 to 200, and for example, 0.3 to 170, based on the evaporation rate of n-butylacetate (n-BuAc) of 100.

The plasticizer may have a density of 0.715 to 0.790 g/cc, for example, 0.723 to 0.785 g/cc as measured at 15.6° C., but is not limited thereto.

In addition, the plasticizer may have a viscosity of 0.70 to 4.0 mm$^2$/s, and for example, 0.80 to 3.85 mm$^2$/s as measured at 25° C., but is not limited thereto.

The plasticizer may be included at 5 to 40 parts by weight, and for example, 7 parts by weight or more or 10 parts by weight or more and 35 parts by weight or less or 30 parts by weight or less, based on 100 parts by weight of the content of the binder.

The dry electrode composition may further include a component which is commonly used for manufacturing an electrode, such as a conductive agent or a particulate binder as required.

The dry electrode composition may further include a conductive agent for improving conductivity. The conductive agent may be used without limitation as long as it is commonly used in a secondary battery, and for example, may be one or more selected from the group consisting of graphite such as natural graphite or artificial graphite, carbon-based materials such as carbon black, acetylene black, ketjen black, carbon fiber, and carbon nanotubes, metal-based materials such as metal powder or metal fiber of copper, nickel, aluminum, silver, and the like, and conductive polymers such as a conductive oxide or polyphenylene derivative.

The conductive agent may be included at a content of, for example, 0.1 to 3 wt % with respect to the total electrode composition, but is not limited thereto.

The dry electrode composition may further include a particulate binder. The particulate binder may be those commonly used in the electrode manufacture, and though it not particularly limited, for example, may be one or more selected from the group consisting of polyvinylidene fluoride, polyvinylidene fluoride-hexafluoropropylene, polyvinylidene fluoride-trichloroethylene, polymethylmethacrylate, polyacrylonitrile, polyvinyl acetate, ethylene-vinyl acetate copolymer, cyanoethyl pullulan, and pullulan.

The particulate binder is not particularly limited, but for example, may be included within a range of 0.5 to 3 wt %.

The present disclosure provides, as an exemplary embodiment, a method for manufacturing an electrode sheet by a dry method using the electrode composition described above. According to an exemplary embodiment, the dry electrode composition including an electrode active material, a binder, and a plasticizer described above may be kneaded and then calendered to manufacture a dry electrode sheet.

If necessary, an operation of mixing the dry electrode composition may be performed. The mixing may evenly disperse the electrode active material, the binder, and the plasticizer after adding them respectively. The mixing method is not particularly limited, and for example, a method of mixing solid powder may be usually applied, and for example, a blender, a mixer, and the like may be used. In the mixing operation, mixing conditions are not particularly limited as long as the dry electrode composition may be mixed.

A operation of kneading the dry electrode composition including the electrode active material, the fiberizable binder, and the plasticizer may be included. In an embodiment, the method for manufacturing an electrode is to manufacture an electrode sheet by a dry method using a powdery dry electrode composition without a solvent, and the kneading evenly disperses the binder included in the dry electrode composition and also fiberizes the binder, thereby binding an electrode active material, and, if necessary, an added conductive agent, and the like. Here, the dispersibility of the binder may be improved and also may promote fiberization of the binder by including the plasticizer.

In the fiberization of the fiberizable binder, the binder is provided with shear pressure while applying heat to the binder, whereby the fiberizable binder in which fine fibers aggregate to form bundles is unraveled to a fine fibrous shape, and thus, may bind to an electrode active material. Furthermore, when an electrode sheet is manufactured, tensile strength may be improved, and a sheet shape may be maintained without a current collector.

The kneading may be performed by applying heat at 30° C. or higher, for example, 35° C. or higher, 40° C. or higher, 50° C. or higher, or 60° C. or higher. At a temperature lower than 30° C., the fiberization of the binder may be insufficient, and thus, the binding force of the electrode active material is insufficient and tensile strength is low, so that the electrode sheet manufactured by calendering may not maintain a sheet shape.

Though the kneading is not limited, the upper limit of the kneading temperature is not particularly limited as long as heat below a temperature at which the thermal decomposition of the fiberizable binder occurs is applied. In addition, the kneading may be performed by applying heat at or below a boiling point of the plasticizer included in the dry electrode composition. For example, the applied heat may be at a temperature of 225° C. or lower, specifically, 220° C. or lower, 215° C. or lower, 210° C. or lower, 200° C. or lower, 180° C. or lower, 150° C. or lower, 120° C. or lower, 115° C. or lower, or 110° C. or lower.

The kneading may provide heat to the dry electrode composition, and more specifically, may be performed using equipment which may provide shear pressure, and for example, may use a screw-type kneader.

In the kneading, process conditions for the kneading are not particularly limited as long as it may fiberize the fiberizable binder. For example, when the screw type kneader is used, the screw may be performed at a rotational speed of 20 to 50 rpm for fiberization of the binder. When the rotation of the screw is less than 20 rpm, sufficient shear pressure is not provided, so that the fiberization of the binder may not sufficiently occur, and when the rotation of the screw is more than 50 rpm, an additional synergistic effect of fiberization may not be provided, and rather, side effects such as breakage of the electrode active material may be caused.

The kneading may be performed for 1 to 10 minutes. When the kneading time is less than 1 minute, the fiberization of the binder may not sufficiently occur, and thus, binding between electrode active materials may be insufficient, and when the kneading time is more than 10 minutes, the electrode active material may be rolled to cause excessive torque.

Next, an operation of calendering the dry electrode composition including the fiberized binder obtained above may be included. The calendering operation is an operation of manufacturing a sheet using the dry electrode composition including the fiberized binder, and an electrode sheet may be manufactured from the electrode composition.

Figure 3:
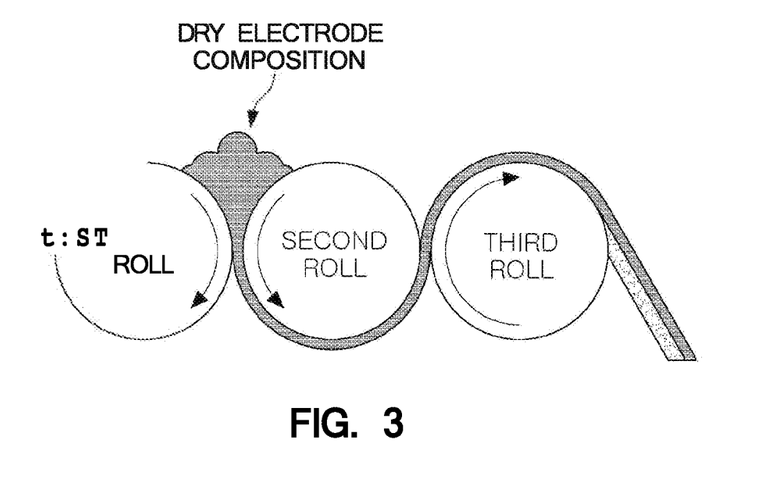
FIG. 3 is a drawing which schematically illustrates a concept of manufacturing a dry electrode sheet using calender roll equipment in Example 1.

The calendering operation may be performed by a calender roll including two or more rolls rotating the dry electrode composition including the fiberized binder. Specifically, as shown in FIG. 3, the dry electrode composition including the fiberized binder is added between two rolls spaced at a predetermined interval and pressure is applied by roll and roll, thereby manufacturing the dry electrode composition in a sheet shape.

The method for manufacturing a dry electrode according to an embodiment in the present disclosure is to manufacture an electrode sheet using powder including an electrode active material and a fiberizable binder without using a solvent, and the fiberizable binder is fiberized by applying heat and pressure, thereby binding the electrode active materials to each other by the fiberized binder. Specifically, the fiberized binder which is included in the dry electrode composition and attached to the surface of particles of the electrode active material, a conductive agent added as required, and the like is softened by heat, and is bound to the adjacent electrode active material and the like by pressure provided during a calendering process, so that a sheet shape may be maintained without a separate support such as a current collector. Otherwise, the calendering may be directly applying the composition on the electrode current collector and calendering with the electrode current collector.

The heat may be provided by heating each roll forming a calender roll to a predetermined temperature range. The heating temperature of the roll is not limited, but may be 40° C. or higher. When the temperature of the roll is lower than 40° C., the fiberized binder has an insufficient binding force with powder such as the electrode active material and the conductive agent, so that tensile strength sufficient for an electrode sheet may not be provided.

As another exemplary embodiment, the calendering may be performed by heating to a boiling point of the plasticizer or higher. Since the plasticizer included in the dry electrode composition may be removed by evaporation by the heating as such, a subsequent process for removing the plasticizer may be omitted.

Meanwhile, the upper limit of the temperature of the calender roll is not particularly limited as long as the thermal decomposition of the fiberized binder is not caused at the temperature. Specifically, the temperature of the roll may be 200° C. or lower, and more specifically, may be 200° C. or lower in terms of preventing the binder from being attached to the surface of the roll.

The calendering operation is not particularly limited, but may be performed multiple times. Since pressure may be further applied to the dry electrode composition by performing calendering multiple times, fiberization of the binder may further proceed, and thus, the tensile strength of the electrode sheet may be further improved. The number of calendering iterations is not particularly limited, and for example, may be 3 or more, 4 or more, 5 or more and 20 or less, 15 or less, 12 or less, 10 or less, or 8 or less. The tensile strength of the electrode sheet may be improved by the repeated calendering as such.

The electrode sheet may be manufactured by the calendering, and then, if necessary, a drying operation for removing the plasticizer from the obtained electrode sheet may be further included. The drying for removing the plasticizer is not particularly limited, and may be performed by applying a temperature equivalent to or higher than the boiling point of the plasticizer. Herein, since the plasticizer is included in a small amount, drying for removing the plasticizer may be performed in a short time, and thus, is distinguished from drying for removing a solvent.

As described above, when the electrode sheet is manufactured by a dry method using the dry electrode composition including the plasticizer with the fiberizable binder, the operation of removing a solvent may be omitted, and thus, electrode manufacturing cost may be reduced, and also, the dispersibility of the binder may be improved and the fiberization of the binder may be promoted by adding the plasticizer, and thus, the tensile strength of the obtained electrode sheet may be further improved.

According to another aspect of the present disclosure, the fiberizable binder is fiberized by a kneading process, thereby providing an electrode sheet having improved tensile strength. In an embodiment, the electrode sheet may include an electrode active material and a fibrous binder. The electrode sheet therefrom may have a tensile strength of 0.40 $N/mm^2$ or more, for example, 0.50 $N/mm^2$ or more, 0.70 $N/mm^2$ or more, 0.80 $N/mm^2$ or more, 0.9 $N/mm^2$ or more, 1.0 $N/mm^2$ or more, or 1.1 $N/mm^2$ or more. When the tensile strength of the electrode sheet is less than 0.40 $N/mm^2$, it may be difficult to maintain for the manufactured electrode sheet to maintain the sheet shape, for example, cracks or breakage occurs in the electrode sheet.

The electrode sheet manufactured by the present embodiment is not particularly limited, but may have an electrode density of 2.0 g/cc or more. For example, the electrode density of the electrode sheet may be 2.1 g/cc or more, 2.2 g/cc or more, 2.3 g/cc or more, 2.4 g/cc or more, 2.5 g/cc or more, or 2.6 g/cc or more.

In addition, although not particularly limited, the electrode sheet may have a thickness of 100 to 500 μm. When the electrode sheet has a thickness of less than 100 μm, the tensile strength of the electrode sheet is insufficient to cause breakage, and when it has a thickness of more than 500 μm, the composition component forming the electrode in the electrode sheet may be non-uniformly mixed in the thickness direction. For example, the electrode sheet may have a thickness of 100 μm or more, 150 μm or more, 200 μm or more, 250 μm or more and 500 μm or less, 450 μm or less, or 400 μm or less.

In addition, according to another aspect of the present disclosure, an electrode including the dry electrode sheet described above is provided. Specifically, the electrode may be manufactured by disposing the dry electrode sheet on at least one surface of an electrode current collector, and performing heating and pressing.

The electrode collector is not particularly limited as long as it has a high conductivity without causing a chemical change in a battery.

For example, when the electrode is a positive electrode, a positive electrode current collector is not particularly limited, but may use a thin plate of an aluminum, stainless steel, or nickel material, and more specifically, may use a thin plate of an aluminum material.

In addition, in the case of a negative electrode, a negative electrode current collector may use copper, stainless steel, aluminum, nickel, titanium, fired carbon, copper, stainless steel having a surface treated with carbon, nickel, titanium, silver, and the like, an aluminum-cadmium alloy, and the like.

The electrode current collector may be in various forms such as a film, a sheet, a foil, a porous body, a foam, a non-woven fabric body, or a reticular or mesh shape. In addition, fine irregularities may be formed on the surface to strengthen a bonding force with the electrode sheet, and in order to prevent oxidation, the surface may be coated with an oxidation-resistant metal or alloy coating.

Furthermore, the electrode may be used as a positive electrode or a negative electrode, or used as a positive electrode or a negative electrode to manufacture a secondary battery. For example, the positive electrode or the negative electrode are stacked in order with a separator as a boundary to manufacture an electrode assembly, and the electrode assembly is accommodated in a battery case with an electrolyte solution and sealed, thereby manufacturing a secondary battery. Herein, though the battery case is not particularly limited, it may be a pouch type case, or a prismatic or cylindrical metal case.

Furthermore, a secondary battery module may be formed using the secondary battery according to the present disclosure, and also, one or more modules may be packaged in a pack case to form a secondary battery pack.

The secondary battery module described above and the secondary battery pack including the same may be applied to various devices. Specifically, the secondary battery module and the secondary battery back including the same may be applied usable various devices, and although not particularly limited, for example, it may be applied to transportation means such as electric bicycles, electric vehicles, or hybrid vehicles.

EXAMPLES

Hereinafter, the present disclosure will be described in detail through the specific examples. The following example is only illustrative for assisting in the understanding of the present disclosure, and the scope of the present disclosure is not limited thereto.

Example 1

96.4 wt % of a positive electrode active material including nickel, cobalt, and manganese at a weight ratio of 8:1:1, 0.6 wt % of a carbon nanotube conductive agent, and 3 wt % of a polytetrafluoroethylene (PTFE) binder were mixed to prepare a dry positive electrode composition. Furthermore, a plasticizer was added at a content shown in Table 1 based on 100 parts by weight of the binder of the dry positive electrode composition.

Figure 1:
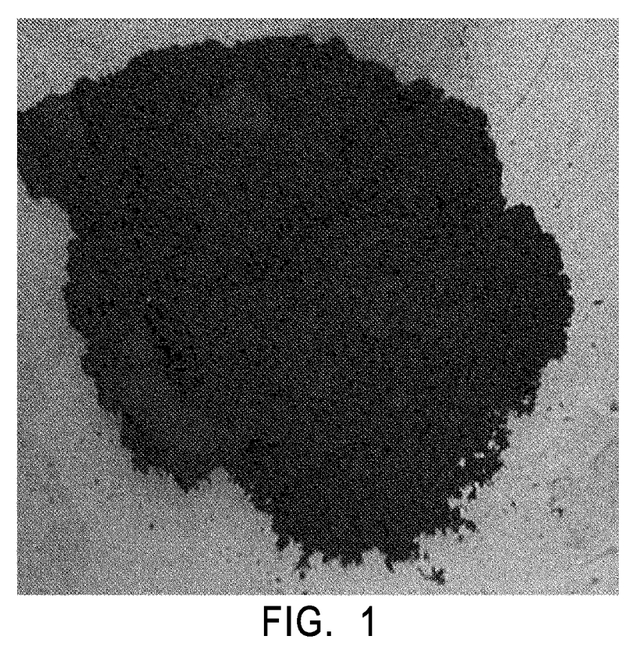
FIG. 1 is a photograph of a dry positive electrode composition mixed in Example 1.
Figure 2:
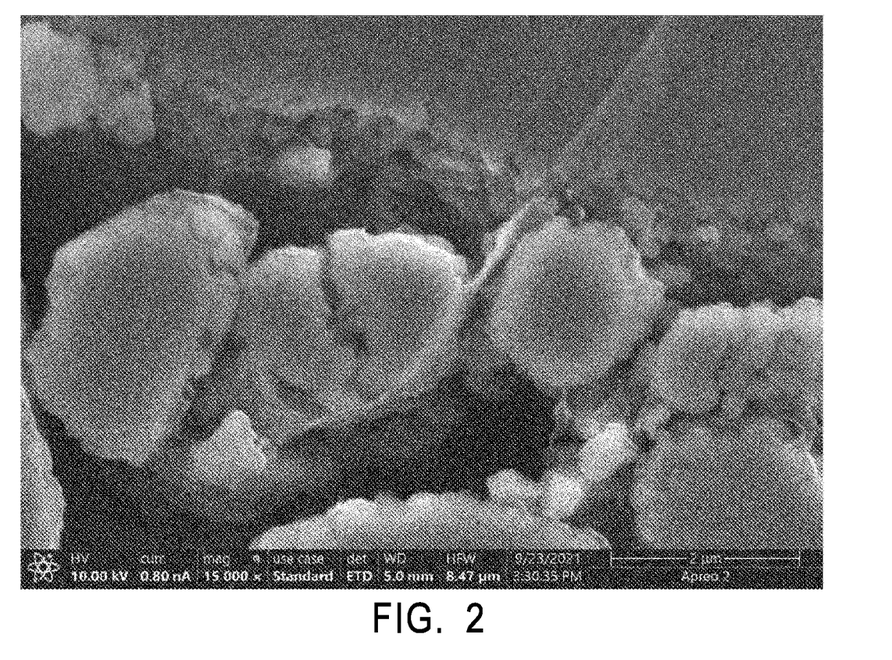
FIG. 2 is a micrograph of a dry positive electrode composition mixed in Example 1.

Thereafter, the dry positive electrode composition was mixed by a blender. The thus-obtained dry positive electrode composition was photographed and is shown in FIG. 1. In addition, the thus-prepared dry positive electrode composition was photographed with an electron microscope and is shown in FIG. 2.

The mixed dry positive electrode composition was calendered using a calender roll as schematically illustrated in FIG. 3 to manufacture a dry positive electrode sheet. At this time, the calender roll was heated to 50° C. to perform calendering.

Figure 4:
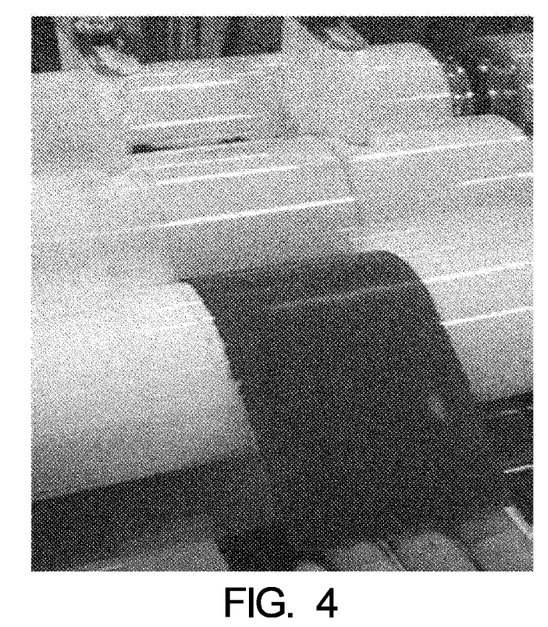
FIG. 4 is a photograph of a dry positive electrode sheet manufactured in Example 1.
Figure 5:
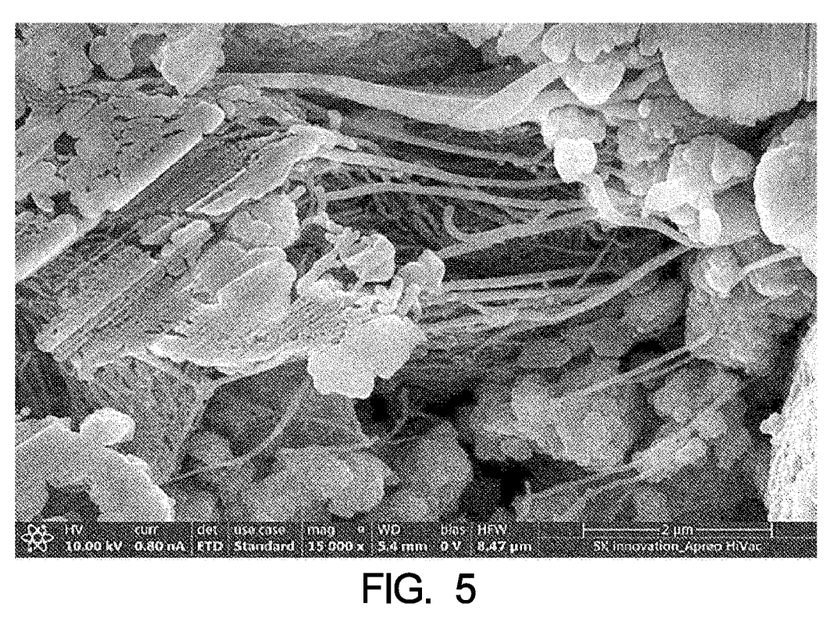
FIG. 5 is a micrograph of a cross section of the dry positive electrode sheet manufactured in Example 1.

The thus-obtained dry positive electrode sheet was photographed and is shown in FIG. 4. In addition, the cross section of the positive electrode sheet was photographed with a microscope and is shown in FIG. 5.

In addition, the tensile strength of the dry positive electrode sheet obtained above was measured by the following method, and the results are shown in Table 1.

Examples 2 to 3

Dry positive electrode sheets were manufactured in the same manner as in Example 1, except that the content of the plasticizer was changed as shown in Table 1.

The tensile strengths of the dry positive electrode sheets manufactured above were measured and are shown in Table 1.

Example 4

A dry positive electrode sheet was manufactured in the same manner as in Example 1, except that the type and content of the plasticizer were changed as shown in Table 1.

The tensile strength of the dry positive electrode sheet manufactured above was measured and is shown in Table 1.

Comparative Example 1

A dry positive electrode sheet was manufactured in the same manner as in Example 1, except that the plasticizer was not included.

The tensile strength of the dry positive electrode sheet manufactured above was measured and is shown in Table 1.

Comparative Examples 2 and 3

Dry positive electrode sheets were manufactured in the same manner as in Example 1, except that the plasticizer was not included and the type of the binder was changed as shown in Table 1.

The tensile strengths of the dry positive electrode sheets manufactured above were measured and are shown in Table 1.

TABLE 1

| | Positive electrode active material content (wt %) | Conductive material content (wt %) | Binder Type | Binder content (wt %) | Plasticizer Type | Plasticizer content (part by weight to binder) | Tensile strength (N/mm$^2$) |
|---|---|---|---|---|---|---|---|
| Example 1 | 96.4 | 0.6 | A | 3 | A | 10 | 1.30 |
| Example 2 | 96.4 | 0.6 | A | 3 | A | 20 | 1.58 |
| Example 3 | 96.4 | 0.6 | A | 3 | A | 30 | 1.72 |
| Example 4 | 96.4 | 0.6 | A | 3 | B | 30 | 1.12 |
| Comparative Example 1 | 96.4% | 0.6 | A | 3 | — | — | 0.95 |
| Comparative Example 2 | 96.4% | 0.6 | B | 3 | — | — | 0.87 |
| Comparative Example 3 | 96.4% | 0.6 | C | 3 | — | — | 0.82 |
| Remarks | Binder A: Grade F-104 PTFE fine powder available from Daikin, Japan elongation: 400%, specific gravity: 2.17 g/cc, tensile strength: 45 N/mm$^2$ Binder B: Grade TF2021Z PTFE fine powder available from 3M, U.S.A. elongation: 380%, specific gravity: 2.15 g/cc, tensile strength: 34 N/mm$^2$ Binder C: Grade DF-201 PTFE fine powder available from Dongyue, China elongation: 520%, specific gravity: 2.2 g/cc, tensile strength: 24 N/mm$^2$ Plasticizer A: Grade ISOPAR-E liquid paraffin available from Exxon Mobile Plasticizer B: Grade ISOPAR-M liquid paraffin available from Exxon Mobile | | | | | | |

As shown in Table 1, the examples and Comparative Example 1 were performed under the same conditions except for whether the plasticizer was added or not, and the tensile strength of the dry positive electrode sheet obtained in Comparative Example 1 was 0.95 N/mm$^2$, but the tensile strength of the dry positive electrode sheet obtained in Examples 1 to 4 was 1.1 N/mm$^2$ or more, which was higher than that of the dry positive electrode sheet manufactured in Comparative Example 1.

It was shown that the fiberization of the binder was more significantly promoted by adding the plasticizer, and thus, the dry positive electrode sheet of Example 1 showed a tensile strength value improved by about 20% as compared with the dry positive electrode sheet of Comparative Example 1.

From FIG. 5 in which the cross section of the dry positive electrode sheet obtained in Example 1 was photographed, it was confirmed that in the dry positive electrode sheet to which a plasticizer was added, the binder was fiberized and bonded the positive electrode active materials to each other, and it is considered that the high tensile strength as the above was shown therefrom.

Meanwhile, Comparative Examples 2 and 3 did not provide an effect of improving tensile strength, in spite of the change of the type of binder.

According to an embodiment in the present disclosure, an electrode sheet having excellent tensile strength may be manufactured using a dry electrode composition without a solvent.

More specifically, fiberization of a binder may be promoted by adding a small amount of a plasticizer to the dry electrode composition including a fiberizable binder, and thus, the tensile strength of an electrode sheet manufactured by a dry method may be further improved.

In addition, by manufacturing an electrode by a dry method, a drying process which is required for removing a solvent in a conventional process of manufacturing an electrode using a slurry including a large amount of solvent may be omitted, and thus, simplification of electrode manufacturing process and facilities may be promoted, and furthermore, facility investment may be reduced, thereby reducing electrode manufacturing cost.

While exemplary embodiments have been shown and described above, it will be apparent to those skilled in the art that modifications and variations could be made without departing from the scope of the present disclosure as defined by the appended claims.

What is claimed is:

1. A method for manufacturing an electrode sheet, the method comprising: calendering an electrode composition, thereby manufacturing the electrode sheet,
    wherein the electrode composition comprises an electrode active material, a binder in which fibers aggregate to form bundles, and a plasticizer,
    wherein the binder is fiberizable by heat or pressure and has a tensile strength of 20 to 50 N/mm$^2$, an elongation of 350 to 550%, and a specific gravity of 2.0 to 2.5 g/cc,
    wherein the plasticizer includes a liquid paraffin having a chemical formula of $C_nH_{2n+2}$, wherein n is 19 or more, having a boiling point of 115 to 150° C., an evaporation rate of 0.1 to 200, a density of 0.723 to 0.785 g/cc as measured at 15.6° C., and a viscosity of 0.80 to 3.85 mm$^2$/s as measured at 25° C.,
    wherein the plasticizer is comprised at a content of 10 to 30 parts by weight with respect to 100 parts by weight of the binder,
    wherein the calendering is performed while heating to a boiling point of the plasticizer to evaporate the plasticizer; and
    wherein no further heating is performed after calendering.

2. The method for manufacturing the electrode sheet of claim 1, wherein the calendering is performed at a temperature of 50 to 150° C.

3. The method for manufacturing the electrode sheet of claim 1, further comprising: kneading the electrode composition under heating to fiberize the binder.

4. The method for manufacturing the electrode sheet of claim 3, wherein the kneading is performed by heating to a temperature of 30 to 200° C.

5. The method for manufacturing the electrode sheet of claim 3, wherein the kneading is performed by applying shear pressure.

6. The method for manufacturing the electrode sheet of claim 3, wherein the kneading is performed at a rotational speed of 20 to 50 rpm.

7. The method for manufacturing the electrode sheet of claim 3, wherein the kneading is performed for 1 to 10 minutes.

* * * * *